Figure 1:
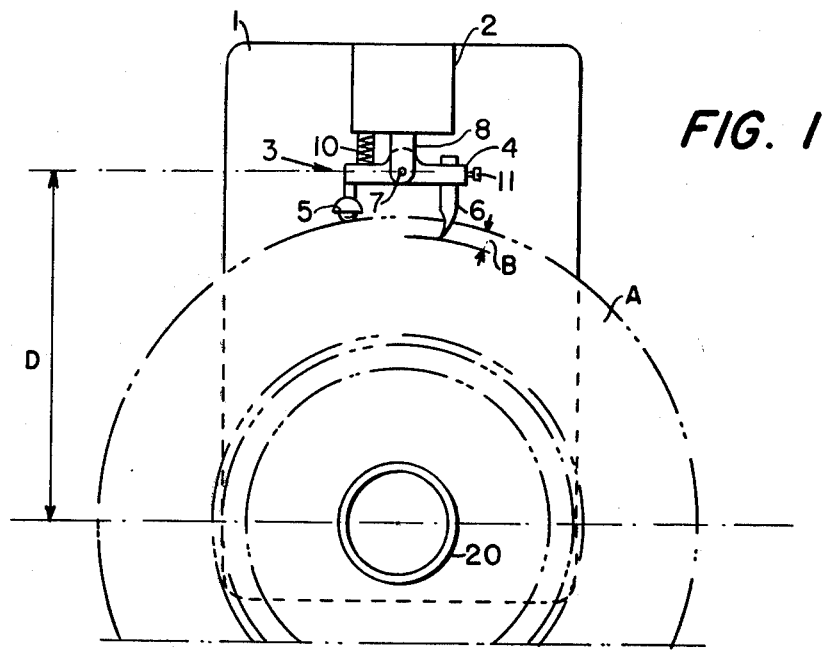

United States Patent [19]

Jarry

[11] 4,147,196

[45] Apr. 3, 1979

[54] APPARATUS FOR CUTTING CIRCUMFERENTIAL GROOVES IN THE TREAD OF A TIRE

[75] Inventor: Jean Jarry, Clermont-Ferrand, France

[73] Assignee: Compagnie Generale des Etablissements Michelin, Clermont-Ferrand, France

[21] Appl. No.: 840,516

[22] Filed: Oct. 3, 1977

[30] Foreign Application Priority Data

Oct. 4, 1976 [FR] France ............................ 76 29995

[51] Int. Cl.² ........................................... B29H 21/00
[52] U.S. Cl. .................................................. 157/13
[58] Field of Search ........................................ 157/13

[56] References Cited
U.S. PATENT DOCUMENTS

| 2,748,859 | 6/1956 | Myklebust et al. | 157/13 |
| 3,136,352 | 6/1964 | Pettit | 157/13 |
| 3,384,146 | 5/1968 | Sommer | 157/13 |

*Primary Examiner*—James L. Jones, Jr.
*Assistant Examiner*—James G. Smith
*Attorney, Agent, or Firm*—Brumbaugh, Graves, Donohue & Raymond

[57] ABSTRACT

An apparatus for cutting circumferential grooves in the tread of a pneumatic tire comprising at least one assembly formed of a knife whose cutting edge has the shape of the radial profile of the grooves to be created and a support to which the knife is connected and which guides the knife with respect to the pneumatic tire to be treated, the support being connected to a frame for bearing the pneumatic tire, is improved by having the support furthermore comprise a feeler. The depth of cut of the knife is controlled by the feeler which is connected to the support and arranged at a short distance from the knife.

11 Claims, 5 Drawing Figures

APPARATUS FOR CUTTING CIRCUMFERENTIAL GROOVES IN THE TREAD OF A TIRE

This invention relates to improvements in apparatus intended for the manufacture of pneumatic tires and more particularly to machines intended for the production of the treads of new or recapped tires.

The treads of tires have elements in relief which are separated by recessed elements. Among the recessed elements used there are included ones which have the shape of circumferential grooves following a straight path, a broken line, or an undulated line.

The present invention applies to the case where these circumferential grooves are made by the removal of material instead of by molding.

Ordinarily there is employed for this purpose a U-shaped or V-shaped knife blade, depending on the radial section of the grooves selected. In order to facilitate the cutting operation, since the knife is guided and moved by hand, the blade is heated. Nevertheless this cutting is laborious whenever the grooves reach a certain depth.

For this reason, it has been proposed to facilitate the work of the operator, for instance, by means of a motor mounted on a device which supports the knife. However, such a device cannot be guided with precision so as to obtain a well-defined groove trace and the treatment of a tread requires a great deal of time, since it is not possible to cut several grooves at the same time.

Finally, it is impossible to control the constancy of the depth of the groove, particularly when treating a tread having an irregular surface, for instance, as a result of wear of the tire. Now it is important to prevent injury to or at least the exposing of the reinforcement in the region of the groove bottom upon the cutting by selecting a suitable depth of cut.

The object of the present invention is to overcome these drawbacks.

The apparatus in accordance with the invention for cutting circumferential grooves in the tread of a pneumatic tire comprises at least one assembly formed of a knife whose cutting edge has the shape of the radial profile of the grooves to be created and a support to which the knife is connected and which guides the knife with respect to the tire to be treated, the support being connected to a frame for bearing the tire. This apparatus is characterized by the fact that the support furthermore comprises a feeler. The depth of cut of the knife is controlled by the feeler which is connected to the support and arranged at a short distance from the knife.

The feeler in accordance with the invention is preferably arranged behind the knife, that is to say in the direction opposite the direction of advance of the knife in the tread. This arrangement makes it possible for the operator more readily to follow up the course of the cutting operation.

The support for the knife/feeler system is preferably fixed with respect to the frame which bears the tire, and the tire is imparted an appropriate movement, for instance, a movement of rotation around its axis. In the example selected, rectilinear circumferential grooves are obtained. In order to obtain broken line or undulated-line grooves, it is merely necessary to impart to the knife an alternately pivoting movement perpendicular to the surface of the tread, this movement being synchronous with a transverse movement of the support of limited amplitude with respect to the equatorial plane of the tire.

However, one can also hold the tire stationary and impart suitable movements with respect to the tire to the knife/feeler system and thus to the knife itself.

The apparatus in accordance with the invention permits a considerable saving in time and, as a result of the feeler which guides the depth of penetration of the knife, grooves of constant depth can be obtained.

The saving in time may be further increased by arranging a plurality of knives with their feelers and supports side by side. These feelers make it possible to juxtapose the knives at a small distance apart. Thus, by means of a suitable number of juxtaposed knives, one can in a single operation cut all of the circumferential grooves of a tread.

If it is desired to cut grooves whose traces are parallel, the knives are arranged in the same radial plane passing through the axis of the tire.

If, on the other hand, the grooves have traces which are staggered circumferentially with respect to each other, the knives may be juxtaposed in the transverse direction with a stagger in circumferential direction from one knife to the next. In certain cases it is sufficient to effect the staggering of the knives by inclining the device itself by a suitable angle with respect to a radial plane of the tire.

The feeler may be a feeler which is in constant contact with the outer surface of the tread. In the present text, this feeler will be referred to as a "surface feeler." This feeler governs the depth of penetration of the knife as a function of the local irregularities of the tread which is to be grooved.

As a variant, when the tire to be treated is provided with at least one ply of metal reinforcing cables below its tread, as is known per se, the feeler may be formed of a detector which is sensitive to the distance between it and the ply of metal reinforcing cables. By means of a suitable device (which is known per se) controlled by the detector and forming a part of the apparatus, the end portion of the cutting edge of the knife is maintained at a predeterminable constant distance from the metal ply. The result is that the bottom of the grooves is arranged at a predeterminable constant distance from the metal ply.

The detector is a metal detector which gives off a signal as a function of the distance between it and the metal ply. In the event that the ply contains steel cables, the detector is preferably of the well-known "magnetic" or "electromagnetic" type.

Another improvement provides for combining the surface feeler with the detector which is sensitive to the distance between it and the metal ply.

In this case, the action of the detector consists in limiting the depth of the grooves. Stated differently, the detector causes the desired minimum distance between the bottom of the grooves and the ply to be respected. For this purpose, it is advisable either to incorporate the distance detector in the surface feeler or to juxtapose the feeler and the detector.

Figure 2:
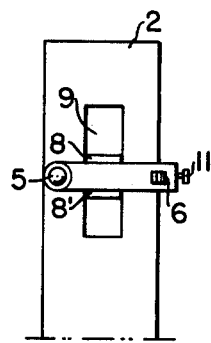
Figure 3:
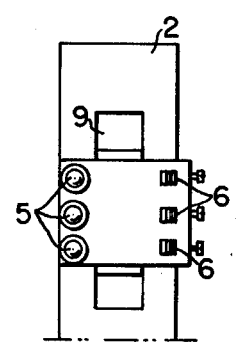
Figure 4:
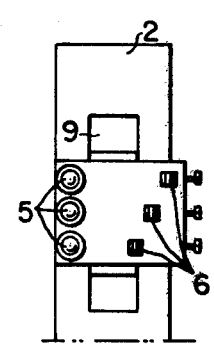
Figure 5:
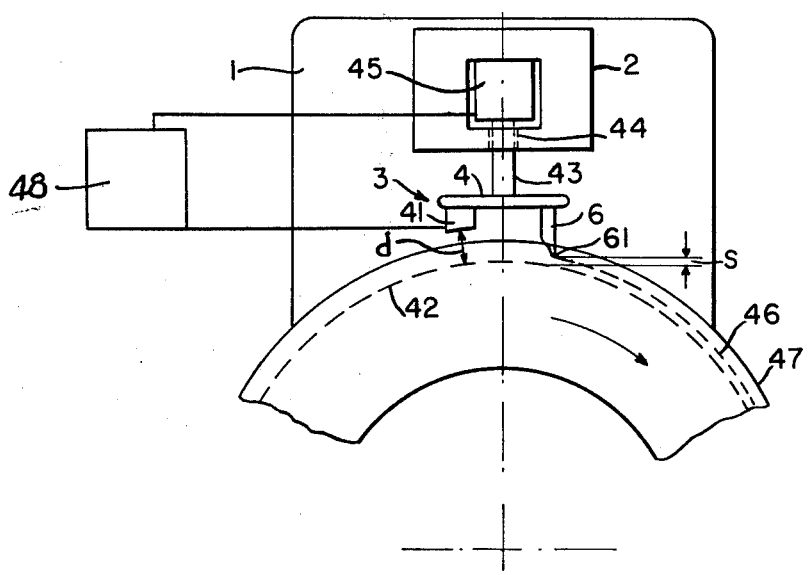

In order to facilitate an understanding of the invention and to give illustrative nonlimitative examples thereof, the following description refers to the accompanying drawing in which:

FIG. 1 is a plan view of an apparatus in accordance with the invention provided with a surface feeler, FIGS. 2 to 4 are elevational views of the knife holder device, and FIG. 5 is a plan view of an apparatus in accordance with the invention, provided with a detector which is sensitive to the distance between it and a ply of metal reinforcing cables.

The apparatus described below with reference to the drawing are assumed to be apparatus on which the tire to be treated is fixed on a device with vertical axis while the knife holder device is fastened on a column, which is also vertical. However, this vertical arrangement is not essential and the invention can be carried out just as well with a horizontal or even inclined arrangement.

The apparatus illustrated in FIGS. 1 to 4 comprises on a base 1 a column 2 in which there is fastened a knife holder device 3, as well as a column 20 which is intended to receive a tire (shown in part), designated by the letter A.

The knife holder device or support 3 comprises a double-armed lever 4 one of whose arms is provided with a feeler 5 and the other with a knife 6. This lever 4 is articulated between the feeler 5 and the knife 6 around a vertical shaft 7 which is mounted between two arms 8, 8' held in the column 2 with the possibility of describing a vertically reciprocating movement in said column 2 under the control of a device (not shown in the drawing). In order to permit this movement, the column 2 has an opening 9.

In order for the feeler 5 to remain applied against the tread of the tire A, a coil spring 10, interposed between the lever arm 4 which bears this feeler 5 and the column 2, urges the lever 4 counterclockwise direction (as seen in FIG. 1).

The portion of the feeler 5 which is applied to the tire A preferably consists of a ball.

The average depth B of embedment of the knife 6 in the tire A is adjustable, before the cutting is started, by displacement of this knife 6 in the lever 4, in which it can be fastened by a locking screw 11 in the position selected.

The distance D between the knife holder 3 and the column 20 which bears the tire A to be cut is adjustable to take into account the different diameters of tires which can be received in the apparatus.

When one or more linear circumferential grooves are to be cut in the tread of a tire A which is fastened to the column 20, this column 20 is placed in rotation (by a drive mechanism not shown in the drawing) and the knife or knives 6 are engaged in the tread after having determined and adjusted the desired depth of cut.

If it is desired to cut broken-line or undulated-line circumferential grooves, the knife holder 3, while the tire A is turning, is imparted a movement of vertical alternation, controlled manually or automatically, the amplitude of which is equal to that of the broken line or undulated line to be produced. If these nonlinear grooves are not to be staggered with respect to each other, one employs a knife holder 3 in which the different knives 6 are arranged in the same radial plane of the tire, as shown in FIG. 3. On the other hand, if it is desired that these grooves not be in phase agreement, one uses a knife holder 3 in which the knives 6 are arranged, as shown in FIG. 4, at different distances from a radial plane of the tire. Although three feelers 5 have been shown in FIGS. 3 and 4, it is possible to provide merely two or even only one feeler.

The apparatus shown diagrammatically in FIG. 5 comprises, in the same manner as the preceding one, a column 2 in which the knife holder device 3 is fastened. The device 3 comprises an arm 4 having, on the one hand, a detector 41 which is sensitive to the distance d from the ply of metal reinforcing cable 42 and, on the other hand, the knife 6. The arm 4 is fastened on a rod 43 which slides in the bearing surfaces 44 of the column 2. The rod 43 is driven by a motor 45. The motor 45 receives a signal, which is a function of the distance d from the detector 41, via a suitable device 48, this enabling the motor 45 to control the position of the arm 4 and therefore of the knife 6 with respect to the metal ply 42. Thus, the tip 61 of the cutting edge of the knife 6 is at a predetermined constant distance s from the metal ply 42. The same is true of the bottom of the groove 46 which the knife 6 cuts in the tread 47.

What is claimed is:

1. An apparatus for cutting at least one circumferential groove in the tread of a tire having at least one ply of metal reinforcing cables below its tread, comprising at least one assembly formed of a knife whose cutting edge has the shape of the radial profile of the grooves to be created and a support to which the knife is connected and which guides the knife with respect to the tire to be treated, the support being connected to a frame for bearing the tire, this apparatus being characterized by the fact that the support furthermore comprises a feeler, said feeler being formed of a detector which is sensitive to the distance between it and said ply, the apparatus furthermore comprising a device controlled by the detector and maintaining the end portion of the cutting edge of the knife at a predeterminable constant distance from said ply.

2. The apparatus according to claim 1, characterized by the fact that the feeler is arranged behind the knife.

3. The apparatus according to claim 1, characterized by the fact that the feeler is arranged in front of the knife.

4. The apparatus according to claim 1, characterized by the fact that the support which is common to the knife and the feeler is stationary and that the tire is rotatable around its axis.

5. The apparatus according to claim 4, characterized by the fact that the knife is alternately pivotable perpendicular to the surface of the tread, this pivotal movement being synchronous with a transverse movement of the support of limited amplitude with respect to the equatorial plane of the tire.

6. The apparatus according to claim 1, characterized by the fact that a plurality of knives associated with feelers are juxtaposed in the same radial plane passing through the axis of the tire.

7. The apparatus according to claim 1, characterized by the fact that a plurality of knives associated with feelers are juxtaposed in the transverse direction with a stagger in circumferential direction from one knife to the next.

8. The apparatus according to claim 1, characterized by the fact that the support comprises a double-armed lever, the arms bearing the feeler and the knife, said lever being articulated between the feeler and the knife around an axis which is parallel to the axis of rotation of the tire and occupies a fixed position with respect to the support.

9. The apparatus according to claim 1, characterized by the fact that the detector is a detector of magnetic type.

10. The apparatus according to claim 1, characterized by the fact that the detector and the knife are connected to a rod which is driven by a motor which is controlled via said device by the detector as a function of the distance between the detector and the ply of metal reinforcing cables.

11. The apparatus of claim 1, characterized by the fact that the detector is a detector of electromagnetic type.

* * * * *